Figure 1:
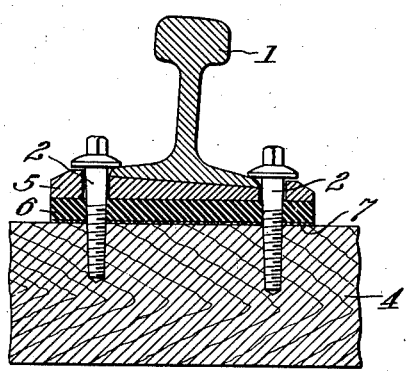

Inventor:
Myrtil Kahn,
By Potter, Pierce & Scheffler,
his Attorneys.

Patented Feb. 7, 1939

2,146,341

UNITED STATES PATENT OFFICE 2,146,341

PERMANENT WAYS

Myrtil Kahn, Cologne-Riehl, Germany

Application June 19, 1934, Serial No. 731,235
In Germany December 12, 1933

1 Claim. (Cl. 238—283)

This invention relates to improvements in permanent ways.

In accordance with the present invention permanent ways are very much improved as to noiselessness by coating parts of the same, particularly sleepers or intermediate pieces, with soft rubber.

For a long time endeavours have been made towards smoothing or damping the strong noise caused by rolling stock on metal rails. A great number of attempts to attain the said aim in more or less complicated ways have been made without success, since the loads carried on rails are usually much higher than those carried by automobiles, so that the methods applicable for the noiseless running of the latter can not be simply transferred to rails and rolling stock. Practically all means suggested, such as layers of rubber on the rims of the railway wheels, or on the surface of the rail, have failed since there existed no possibility of durably attaching rubber to metal surfaces, particularly to steel, without the assistance of mechanical means, which latter lead, however, to a comparatively quick deterioration of the rubber owing to the rubbing of recesses or holes in the rubber layers at said means.

In my copending application Serial Number 679,331, filed July 7, 1933, now Patent No. 2,057,955, dated October 20, 1936, I have shown a method of overcoming the said disadvantages by attaching soft rubber to the bottom of the rails by means of isomerized rubber.

I have now found that the desired aim of avoiding the noise of rolling stock on metal rails, such as of railway, street car and underground traffic, can be simply attained by firmly interposing at least one sheet of a soft rubber material, such as natural or synthetic rubber, guttapercha or balata, or soft vulcanization products thereof, between rail and sleeper with the aid of an intermediate adhesive layer of strongly adhesive rubber, so that the intermediate layer is firmly attached to one horizontal surface of the supporting means for the rails.

The said layers of rubber material may be thus fixed to the upper side of sleepers, either entirely or, preferably, only at the rail-contacting portions to the rail-covered upper side of the intermediate pieces, like supports and hook-plates, to the sleeper-covering lower side of these intermediate pieces, or also to the upper and lower sides of these intermediate pieces.

By the term "strongly adhesive rubber" I wish to define rubber adhesives which join rubber to other surfaces much more firmly than the other known rubber cements. These rubber adhesives may be obtained, for example, by isomerizing rubber with the aid of heat or chemical agents as described, for example, in the British Patents Nos. 352,080 and 371,339, the French Patent No. 709,814 and the U. S. Patents Nos. 1,732,886 and 1,744,880, or by the combination of rubber with haemoglobin as described in the U. S. Patent No. 1,841,322, or with copper and cobalt salts as described in the British Patent No. 307,056.

In the following the invention will be described with greater particularity and with reference to the accompanying drawing, in which—

Figure 2:
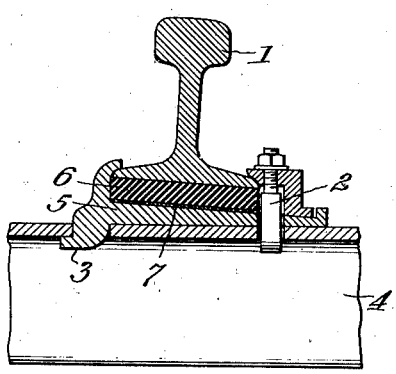
Figure 3:
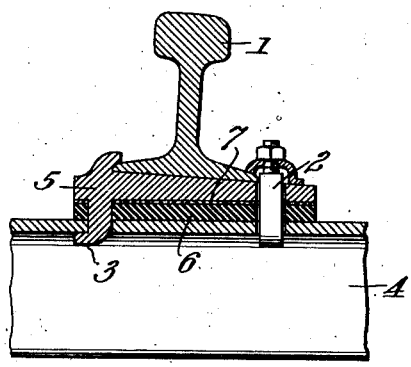
Figure 4:
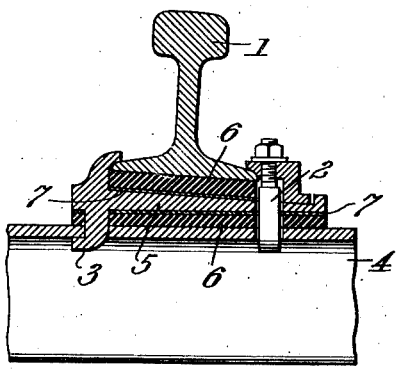
Figure 5:
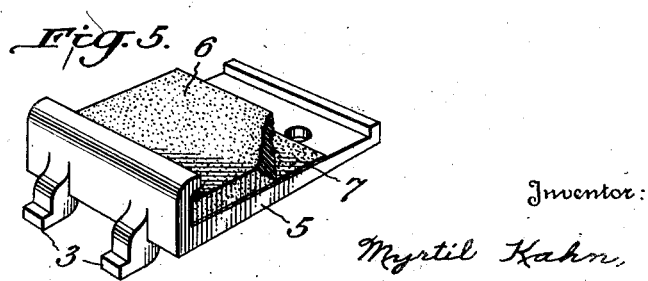

Figures 1 to 4 inclusive are cross-sectional views of rails supported upon intermediate pieces resting on sleepers with noise-deadening layers interposed between rails and sleepers, and Figure 5 is a perspective view of the intermediate piece of Figures 2 to 4 inclusive showing a noise-deadening layer adhesively secured to the upper surface thereof.

Figure 1 shows a rail 1, an intermediate piece 5, an intermediate layer of vulcanized rubber material 6 firmly fixed to the sleeper 4 by means of an adhesive layer of, for example, isomerized rubber 7 and the usual screws 2. A similar arrangement is shown in Figure 2 in which, however, the intermediate piece is a so-called hook-plate 5, the hook 3 of which replaces one of the screws shown in Figure 1. In this case the intermediate layer 6 is fixed to the top of the hook-plate by means of the adhesive layer 7. This same embodiment is illustrated in Figure 5 which shows the hook-plate 5 with rubber layer 6 adhesively secured, by adhesive layer 7, to the upper surface of the plate. Figure 3 shows a hook-plate 5 the bottom of which is covered with an intermediate layer of vulcanized rubber material 6 by means of the adhesive layer 7. Figure 4 shows a hook-plate 5 the top and bottom of which are both covered with an intermediate layer of vulcanized rubber material 6 by means of the adhesive layer 7.

The covering of the supporting means with the soft vulcanized rubber material may be carried out by coating it with isomerized rubber and pressing on a sheet of vulcanized rubber material while the coating is tacky and preferably while warming, or one surface of the said sheet may be isomerized and then pressed on the desired place.

The following examples will further illustrate the invention:

*Example 1*

The rail-covered portions of iron or wooden sleepers are freed from impurities and then coated with a solution in benzene of isomerized rubber prepared by heating rubber for about six hours together with about 7 per cent by weight of phenol sulfonic acid to about 140° C. After drying, a sheet of soft rubber is pressed on the film formed while heating for about one hour and a half to about 125° C. Rails are then fastened to the sleepers as shown in Figure 1.

Example 2

The rail-covered portion of a hook-plate is covered with a sheet of rubber of from 2 to 3 cms. thickness in the manner described in Example 4 of the British specification No. 371,339. Rails are then fastened to the sleepers with the hook-plates thus prepared as shown in Figure 2.

Example 3

The lower surface of a hook-plate is coated with a sheet of soft rubber of about 2 cms. thickness with the aid of an intermediate layer prepared according to the methods described in the British Patent 307,056.

Example 4

The upper and lower surfaces of bed-plates are coated with a sheet of soft rubber of about 2 cms. thickness with the aid of an intermediate layer prepared according to the method described in the U. S. Patent 1,841,332.

What I claim is:

The combination with a railroad rail, a tie and a tie plate for supporting said rail on said tie, of two layers of resilient rubber material permanently attached respectively to the upper and to the lower surfaces of said tie plate by means of a strongly adherent adhesive material, said rubber material layers covering all of the surfaces of said plate which when in normal use would engage either said rail or said tie, said rubber layers being otherwise free of attachment, whereby the tie plate and adherent rubber layers may be handled as a unit and said rail may have cushioned relative movement on said tie plate and said tie plate be cushioned on said tie.

MYRTIL KAHN.